днеunited States Patent Office 3,467,715
Patented Sept. 16, 1969

3,467,715
2,4-DILOWERALKANOYL PHLOROGLUCINOL DERIVATIVES
John L. Broadbent, Tewin Wood, Kenneth Bowden, Bramfield, and William James Ross, Welwyn Garden City, England, assignors to Smith Kline & French Laboratories, Philadelphia, Pa., a corporation of Pennsylvania
No Drawing. Filed Jan. 18, 1968, Ser. No. 698,699
Claims priority, application Great Britain, June 12, 1963, 23,477/63
Int. Cl. C07c *43/20, 43/28*
U.S. Cl. 260—592         6 Claims

ABSTRACT OF THE DISCLOSURE

Novel new compounds having the basic structure of 2,4-diacylphloroglucinol. Said compounds have pronounced anthelmintic activity, especially demonstrated by substantial in vivo activity.

---

This application is a continuation-in-part of copending Ser. No. 373,061 filed June 25, 1964 now U.S. Patent No. 3,377,241 issued April 9, 1968.

This invention relates to anthelmintic compositions containing diacyl derivatives of phloroglucinol, to methods for producing anthelmintic activity using said derivatives and to certain novel derivatives of phloroglucinol which may be advantageously used in said anthelmintic methods and compositions.

According to one aspect of the invention, there are provided an anthelmintic composition and method of producing anthelmintic activity which utilizes as the essential active ingredient a phloroglucinol derivative represented by the general formula:

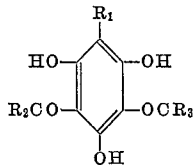

wherein $R_1$ is hydrogen, a lower alkyl group preferably containing up to 2 carbon atoms, or a halogen atom such as chloro, bromo, fluoro or iodo atom, and $R_2$ and $R_3$, which may be the same or different, are (a) straight or branched chain saturated alkyl groups containing from 1 to 12 carbon atoms, preferably from 1 to 8 carbon atoms, or (b) aralkyl groups of the general formula:

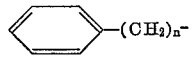

wherein $n$ is 1, 2 or 3, there usually being in association with the active ingredient a non-toxic carrier therefor.

It is preferred to use as the active ingredient of the composition a phloroglucinol of Formula I in which $R_1$ is hydrogen or methyl, and $R_2$ and $R_3$ are straight or branched chain saturated alkyl groups containing from 4 to 8 carbon atoms. The most advantageous compound is that of Formula I in which $R_1$ is hydrogen and $R_2$ and $R_3$ are n-butyl.

All but two of the compounds of Formula I are believed to be novel compounds and such of the compounds as have been mentioned in the literature have not had any pharmacological activity attributed to them. For example, the chemical 2,4-diacetylphloroglucinol has been reported by Beilstein 8, 493, I 733, II 595; Campbell, J. Am. Chem. Soc., 73, 2708 (1951). The chemical 2,4-dipropionylphloroglucinol has been reported erroneously by Israelstam, Chemical Abstracts 38, 731. The compound reported here is actually the 2,4,6-triacyl compound.

The subject of this application is 2,4-diacylphloroglucinols of the formula:

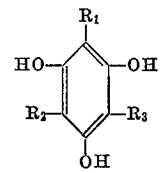

in which $R_2$ and $R_3$ are both lower alkanoyl of from 4–9, preferably 4–6, carbon atoms and $R_1$ is hydrogen, methyl or halo such as chloro or bromo. These new compounds are distinguished over the prior art monoacyl or 2,4-diacetylphloroglucinols in that they all have in vivo anthelmintic activity against *H. nana* reducing the worm content over untreated controls by at least 50%. See our papers in British Journal of Pharmacology and Chemotherapy, 24, 714 (1965) and J. Pharm. Pharmacol., 17, 239 (1965) both of record in the mentioned parent record. Said prior art compounds have no such in vivo activity.

Examples of very active novel compounds falling within Formula I are 2,4-dibutyrylphloroglucinol, 2,4-diisobutyrylphloroglucinol and 2,4-divalerylphloroglucinol. The latter compound is several fold more active and better tolerated than are the previously known compounds mentioned above.

The compounds of Formula I normally form salts with inorganic and organic bases and accordingly the stable nontoxic salts formed with pharmaceutically acceptable strong inorganic and organic bases may be alternatively employed in the compositions of the invention. The cations of such salts are those derived, for example, from magnesium, piperazine or the alkali metals such as sodium, potassium or calcium. Other nontoxic molecular complex known to exist derived from phloroglucinal derivatives may also be used in this invention since the anthelmintic activity rests in the diacylphloroglucinol structure itself.

The compounds of Formula I in which $R_1$ is hydrogen or lower alkyl and $R_2$ and $R_3$ are the same, are prepared by diacylating phloroglucinol or an appropriately alkyl substituted phloroglucinol, preferably in the presence of a catalyst such as, for example, boron trifluoride diethyl etherate, with an acid anhydride of the general formula $(R_2CO)_2O$, in which $R_2$ has the same meaning as in Formula I, in an amount such as to give the desired diacyl compound. When $R_2$ and $R_3$ are different, the compounds are prepared by successively reacting the phloroglucinol starting material with the appropriate acid anhydrides $(R_2CO)_2O$ and $(R_3CO)_2O$. The reaction is preferably carried out in a suitable inert liquid medium, for example ether or methylene dichloride.

Alternatively, these compounds are prepared by reacting phloroglucinol or an appropriately substituted phloroglucinol with an appropriate organic acid, or when $R_2$ and $R_3$ are different, stepwise with two appropriate organic acids, in the presence of a catalyst such as, for example, gaseous boron trifluoride or a Lewis acid such as $AlCl_3$, $ZnCl_2$, $TiCl_4$ or $SnCl_4$. The reaction is carried out in the absence or presence of an inert organic solvent, for example 1,2-dichloroethane, by passing gaseous boron trifluoride into a mixture of the phloroglucinol and organic acid until the mixture is saturated with the gaseous boron trifluoride. When an inert solvent is used the resulting reaction mixture may be optionally heated under reflux or left at room temperature until the desired reaction has been completed, although generally the yield obtained by using the refluxing method is higher than that obtained by the latter.

In the case of the phloroglucinol derivatives of Formula I in which $R_1$ is halogen, these may advantageously be prepared by halogenating the appropriate disubstituted phloroglucinol, rather than by diacylating the monohalogenated phloroglucinol, in view of the difficulty in preparing the halogenated starting material. The halogenation may be carried out by reacting the disubstituted phloroglucinol, preferably dissolved in an inert organic solvent, for example chloroform, with the appropriate halogen, preferably dissolved in an inert solvent such as chloroform.

Compositions containing the phloroglucinol derivatives of Formula I have been found to possess useful anthelmintic properties. In particular, these compounds have been found to exhibit in the host high activity against various helmintic infections of the intestinal tract coupled with low systemic toxicity to the host. For example, they are effective against various hook worm infestations, such as *Necator americanus*, Bunostomium, *Ancylostoma canina*, *Uncinaria stenocephala*, *Ancylostoma duodenale* and Monodontus. In addition, some of the compounds have been found to exhibit considerable antibacterial and antifungal activities.

The compositions of this invention also are active teniacides such as against infections of Moniezialexpansa, Thysanosoma actinioides, *Hymenolepsis nana*, various Raillietina, Taenia solium, Taenia pisiformis, Echinococcus granulosis, Davainea proglottina and Dipylidium caninum.

The compositions and method of this invention are particularly effective in clearing rats of natural infestations for laboratory purposes. Other worm infestations which may be treated as described are Nippostrongylus, Bunostomum sp., Oesophagostomum sp., Taenia echinococcus or Oesophagostomum.

In formulating the anthelmintic compositions of the invention, the pharmacologically active compound of Formula I is usually associated with a nontoxic carrier therefor. The carrier may be an orally ingestible container for the active ingredient, for example a hard or soft gelatin capsule, or it may be a pharmaceutically acceptable diluent or excipient of the kind normally used in the production of medicaments ready for use, for example maize starch, terra alba, lactose, calcium phosphate, gelatin, talcum, stearic acid, magnesium stearate or dextrin.

The compositions are most often made up in a form suitable for internal administration and may therefore take the form of a liquid, for example, an emulsion or a sterile solution or suspension in water, oil such as arachis oil or other liquid. For clinical use, the compositions are advantageously made up in a dosage unit form adapted for the desired mode of administration. Thus for the preferred oral administration the dosage unit may take the form of a tablet, pill, packaged powder, bolus or encapsulated powder. The quantity of active ingredient in each dosage unit will be such that one or more units are required for each therapeutic administration.

The amount of ingredient will also depend on the weight of the host but will usually be between about 5–600 mg./kg. preferably 25–500 mg./kg. Animals of lower weight will be treated with dose from the upper part of the dose range; animals of higher body weight will receive dose from the lower part of the dose range. Usually a single dose is used for each animal species based on the average weight of the species.

For example, the preferred bisvalerylphloroglucinol at an oral dose of 50 mg./kg. in clearing mice of *Hymenolepsis nana* infection by the method of Stewards gives a 61% result while at 400 mg./kg. dose gives 99%. Its $LD_{50}$ in mice is 6 g./kg. Common dosage in dogs runs from about 0.25–6 g. (preferably 1–4 g.), usually in oil given orally. In in vitro anthelmintic tests the compounds of this invention have activities in the dilution range of about 1/50,000 to 1/50,000,000.

For certain veterinary uses, the compounds of Formula I may be made up in the form of an animal food concentrate or feed supplement, or the compounds per se may be added to an animal foodstuff for ingestion by the host animal. Also, these compounds may be administered in lower doses prophylactically usually in the animal's feed in order to keep worm infestations under control.

As previously mentioned, the phloroglucinol derivatives of Formula I have general anthelmintic activity and accordingly a further and most important aspect of this invention provides a method of treating helminthic infections in a host which comprises administering, usually orally, to the host in a sufficient nontoxic but effective dose an anthelmintic compound falling within the definition of Formula I, generally in the form of a pharmaceutical or veterinary composition as hereinbefore described. The daily dose range commonly used is from about 25 mg./kg. to about 800 mg./kg. depending on the species of host and regimen used. One dose a day administration is preferred but up to six of the dosage units described above may be used if desired.

The following examples illustrate the preparation of phloroglucinol derivatives which may be employed in formulating the compositions of the invention but are not considered limiting the invention described herebefore.

Example 1

Phloroglucinol (0.05 mol) and butyric acid anhydride (0.1 mol) in boron trifluoride diethyl etherate (60 ml.) are heated on a water-bath for four hours and the resulting homogeneous mixture poured into aqueous alcoholic sodium acetate (50 g. in 100 ml. of 20% ethanol). Ether is removed by warming on a water-bath or by a current of air, following which 2,4-dibutyrylphloroglucinol separates out as an oil which is extracted with ether, washed with water and sodium bicarbonate solution, dried and then evapoarted to dryness to yield the product which, when recrystallized from ethyl acetate/ light petroleum (B.P. 60–80° C.) is obtained as needles having a M.P. of 135–137° C.

Example 2

The procedure of Example 1 is repeated, the phloroglucinol being replaced by 2-methylphloroglucinol, to obtain 2,4-dibutyryl-6-methyl-phloroglucinol as a crystalline mass which is filtered at the pump. When recrystallized from ethyl acetate/light petroleum (B.P. 60–80° C.) the product is obtained as needles having a M.P. of 120–121° C.

Example 3

The procedure of Example 1 is repeated, the butyric acid anhydride being replaced by isobutyric acid anhydride, to obtain 2,4-di-isobutyrylphloroglucinol as an oil. When recrystallized from light petroleum (B.P. 40–60° C.) the solid product is obtained as prisms having a M.P. of 128–130° C.

Example 4

The procedure of Example 3 is repeated, the phloroglucinol being replaced by 2-methyl-phloroglucinol, to obtain 2,4-di-isobutyryl-6-methyl-phloroglucinol as an oil. When recrystallized from light petroleum (B.P. 60–80° C.), the solid product is obtained as needles having a M.P. of 115–116° C.

Example 5

The procedure of Example 1 is repeated, the butyric acid anhydride being replaced by n-valeric acid anhydride, to obtain 2,4-di-n-valerylphloroglucinol as an oil. When recrystallized from light petroleum (B.P. 60–80° C.), the solid product yields needles having a M.P. of 104–106° C.

Example 6

The procedure of Example 5 is repeated, the phloroglucinol being replaced by 2-methyl-phloroglucinol, to obtain 2,4-di-n-valeryl-6-methyl-phloroglucinol as an oil. When recrystallized from light petroleum (B.P. 60–80° C.), the solid product is obtained as prisms having a M.P. of 98–100° C.

Example 7

Phloroacetophenone (8.4 g., 0.05 mol) in butyric anhydride (7.9 g., 0.05 mol) and boron trifluoride diethyl etherate (40 ml.) are heated on the boiling water-bath for 2 hours and then poured into warm sodium acetate solution (50 g. per 100 ml. of 20% ethanol). The excess ether is removed by warming on the water-bath when an oil separates which solidified on cooling to 0° C. 2-acetyl-4-butyryl-phloroglucinol is obtained as a red product (9 g.) which separates from aqueous alcohol as colorless shiny needles (hydrate) having a M.P. of 95–97° C.

Example 8

The procedure of Example 1 is repeated, the butyric acid anhydride being replaced by propionic acid to obtain 2,4-dipropionylphloroglucinol as a crystalline solid which is filtered at the pump. When recrystallized from ethyl acetate, the product is obtained as needles having a M.P. of 152–154° C.

Example 9

The procedure of Example 8 is repeated, the phloroglucinol being replaced by 2-methyl-phloroglucinol, to obtain 2,4-dipropionyl-6-methyl-phloroglucinol as a crystalline solid. When recrystallized from ethyl acetate/light petroleum (B.P. 60–80° C.) the product is obtained as needles having a M.P. of 135–137° C.

Example 10

2,4-dibutyrylphloroglucinol (5.08 g.; 0.02 mol) in chloroform (75 ml.) is stirred at room temperature during the addition of bromine (3.2 g.; 0.02 mol) in chloroform (15 ml.) over a period of 15 minutes. Stirring is continued for a further 15 minutes and the resulting mixture then washed several times with water and one with saturated sodium bicarbonate solution (50 ml.). The chloroform layer is separated, dried with $MgSO_4$ and the solvent removed in vacuo giving 2,4-dibutyryl-6-bromo-phloroglucinol as a white solid (6.2 g.) which separates from light petroleum (B.P. 60–80° C.) as fine needles, M.P. 102–104° C.

Example 11

Phloroglucinol (18.9 g.; 0.15 mol) and excess n-valeric acid in 1,2-dichloroethane (189 ml.) is stirred and saturated with boron trifluoride gas (40 g. is absorbed in 30 minutes) without external cooling. The temperature rises from 22 to 72° C. during the addition of the $BF_3$. When the mixture is saturated with $BF_3$, the gas is bubbled in for a further 5 minutes. The resulting mixture is then heated under reflux for 60 minutes which time boron trifluoride is evolved, then cooled to room temperature and poured into a sodium acetate solution formed by dissolving sodium acetate trihydrate (150 g.) in water (300 ml.). The organic phase is separated, neutralized with sodium bicarbonate solution, dried and the solvent removed in vacuo to yield an oil from which the 2,4-di-n-valerylphloroglucinol separates as blades (26.8 g.; 60.8%) having a M.P. of 103–106° C. on the addition of light petroleum (B.P. 40–60° C.). The pure product is obtained by one recrystallization from light petroleum (charcoal) as blades, M.P. 105–106° C. (yield, 23.25 g.; 52.6%).

Example 12

Example 11 was repeated except that after saturation with boron trifluoride gas, the reaction mixture is not heated under reflux for 1 hour but is left at room temperature for the same length of time. The yield of pure 2,4-di-n-valerylphloroglucinol is somewhat lower, namely 44.6%.

Example 13

Phloroglucinol (3.15 g.; 0.025 mol) and excess n-valeric acid are stirred together and saturated with boron trifluoride gas (9.5 g. absorbed in 15 minutes) without external cooling. The temperature rises to 70–80° C. During the reaction the phloroglucinol dissolves but when saturation is nearly complete the boron trifluoride complex of the product crystallizes out. The crystalline mass is cooled to room temperature and the complex destroyed by addition of a sodium acetate solution formed by dissolving sodium acetate trihydrate (25 g.) in water (50 ml.), when an oil separates. The oil is extracted into methylene chloride (3×30 ml.). The organic phase is neutralized with sodium bicarbonate solution, dried with $MgSO_4$ and the solvent removed in vacuo yielding an oil which solidifies. The desired 2,4-di-n-valerylphloroglucinol (3.4 g.; 46.3%) when obtained by recrystallization from light petroleum (B.P. 60–80° C.) has a M.P. of 105–106° C.

Example 14

2,4-divalerylphloroglucinol (5.0 g.) is added in small portions to a stirred solution of anhydrous sodium carbonate (2.705 g.) in distilled water (150 ml.) and ethanol (20 ml.). The phenol dissolves yielding a golden yellow solution which is then freeze-dried to obtain a white powder. The trisodium salt of 2,4-divalerylphloroglucinol is readily soluble in water and an aqueous solution of it yields 2,4-divalerylphloroglucinol on acidification with dilute mineral acid.

The trisodium salt of divalerylphloroglucinol does not melt but shrinks at 140° C. and decompoes at 180° C.

Example 15

2,4-divalerylphloroglucinol (5.0 g.) in ether (25 ml.) is added to a stirred suspension of light magnesium oxide (12.5 g.) in ether. The resultant thin paste is stirred for a further hour, poured into a crystallizing dish and the ether allowed to evaporate. The white powder so obtained is then stirred with distilled water (2×250 ml.) for 1 hour and the suspension filtered through a Buchner funnel. The filtrates are then freeze-dried yielding a white powder (25% yield) which is soluble in water. 2,4-divalerylphloroglucinol can be recovered from an aqueous solution of the magnesium salt on acidification with dilute mineral acid. The magnesium salt has a decomposition point above 200° C.

EXAMPLE 16

Piperazine hexahydrate (5.83 g.; 0.03 mol) in water (200 ml.) an dethanol (75 ml.) is shaken with 2,4-divalerylphloroglucinol (5.88 g.; 0.02 mol) until a clear yellow solution is obtained. The solution is filtered and freeze-dried when a pale yellow solid (M.P. 80–85 C.) is obtained. This solid is readily soluble in water and solutions of it yield 2,4-divalerylphloroglucinol on acidification with dilute mineral acid.

The following example illustrates the formulation of a pharmaceutical composition in accordance with the invention.

EXAMPLE 17

Tablets are prepared by granulating and compressing the following ingredients in accordance with known pharmaceutical techniques:

|   | Mg. per tablet |
|---|---|
| 2,4-di-n-valerylphloroglucinol | 200 |
| Terra alba | 150 |
| Mazie starch | 18 |
| Icing sugar | 11 |
| Gelatin (used as aqueous 5% w./w. solution) | 4 |
| Dried starch | 11 |
| Talcum | 4 |
| Magnesium stearate | 2 |

The resulting tablets are then coated with methyl methacrylate to form an enteric coating, i.e., a coating which is substantially insoluble in gastric secretion but substantially soluble in intestinal fluids.

It will be appreciated that the active ingredient used in the formulation of the tablets described above may be replaced by other compounds of Formula I having the necessary anthelmintic activity. Furthermore, other materials may be used to form the enteric coating, for example other synthetic plastic materials such as methyl acrylate, cellulose derivatives, hydrogenated castor oil or phthalates.

The compositions thusly prepared are administered, usually orally, to an infected host from 1–6 times daily for anthelmintic activity.

The following compounds have been prepared by the methods described above:

| Compound: | Melting point ° C. |
|---|---|
| 2,4-dihexanoylphloroglucinol | 97–98 |
| 2-acetyl-4-propionylphloroglucinol | 149–150 |
| 2,4-diheptanoylphloroglucinol | 96–98 |
| 2,4-di-(4-methylvaleryl)-phloroglucinol | 114–116 |
| 2,4-dihexanoyl-6-methyl-phloroglucinol | 108–110 |
| 2,4-diheptanoyl-6-methyl-phloroglucinol | 108–110 |
| 2,4-diphenylacetylphoroglucinol | 170–172 |
| 2-acetyl-4-n-valerylphloroglucinol | 129–131 |
| 2,4-di-n-nonanoylphloroglucinol | 84–87 |
| 2,4-di-isovaleryl-6-methyl-phloroglucinol | 123–125 |
| 2,4-di-n-octanoyl-6-methyl-phloroglucinol | 102–104 |
| 2,4-di-n-octanoylphloroglucinol | 93–95 |
| 2,4-di-isovalerylphloroglucinol | 113–114 |
| 2,4-di-n-decanoylpholoroglucinol | 80–82 |
| 2,4-di-n-nonanoyl-6-methyl-phloroglucinol | 100–102 |
| 2,4-di-n-decanoyl-6-methyl-phloroglucinol | 99–101 |
| 2,4-di-(4-methylvaleryl)-6-methyl-phloroglucinol | 95–88 |
| 2,4-divaleryl-6-bromo-phloroglucinol | 89–91 |

What is claimed is:
1. Compounds of the formula:

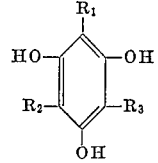

in which $R_2$ and $R_3$ are both lower alkanoyl of from 4 to 9 carbon atoms and $R_1$ is hydrogen, methyl or halo.

2. The compound of claim 1 in which $R_1$ is hydrogen and $R_2$ and $R_3$ are both valeryl, said compound being 2,4-divaleryl-phloroglucinol.

3. The compound of claim 1 in which $R_1$ is hydrogn and $R_2$ and $R_3$ are both butyryl, said compound being 2,4-dibutyryl-phloroglucinol.

4. The compound of claim 1 in which $R_1$ is hydrogen and $R_2$ and $R_3$ are both isovaleryl, said compound being 2,4-di-isovalerylphloroglucinol.

5. The compound of claim 1 in which $R_1$ is methyl and $R_2$ and $R_3$ are both butyryl, said compound being 6-methyl-2,4-dibutyrylphloroglucinol.

6. The compound of claim 1 in which $R_1$ is hydrogen and $R_2$ and $R_3$ are isobutyryl, said compound being 2,4-di-isobutyrylphloroglucinol.

References Cited

FOREIGN PATENTS 157,854  1922  Great Britain.

OTHER REFERENCES

Nakazawa et al. J. Pharmaceutical Society of Japan 74, 1254–1255 (1954).

Campbell et al., J. Am. Chem. Soc. 73, 2708–2712 (1951).

DANIEL D. HORWITZ, Primary Examiner

U.S. Cl. X.R.

424—331